(12) United States Patent
Fourati et al.

(10) Patent No.: US 11,534,699 B2
(45) Date of Patent: Dec. 27, 2022

(54) DISTRIBUTOR TRAY WITH COMPARTMENTS AND GAS RISERS OF THE SAME SHAPE FOR AN OFFSHORE GAS/LIQUID CONTACT COLUMN

(71) Applicant: IFP Energies Nouvelles, Rueil-Malmaison (FR)

(72) Inventors: Manel Fourati, Venissieux (FR); Pascal Alix, Roussillon (FR); Philippe Beard, Saint Genis-Laval (FR); Yacine Haroun, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 216 days.

(21) Appl. No.: 16/955,206

(22) PCT Filed: Nov. 30, 2018

(86) PCT No.: PCT/EP2018/083120
§ 371 (c)(1),
(2) Date: Jun. 18, 2020

(87) PCT Pub. No.: WO2019/120937
PCT Pub. Date: Jun. 27, 2019

(65) Prior Publication Data
US 2020/0338470 A1   Oct. 29, 2020

(30) Foreign Application Priority Data
Dec. 19, 2017 (FR) ...................... 1762481

(51) Int. Cl.
*B01D 53/18* (2006.01)
*B01D 3/00* (2006.01)
(Continued)

(52) U.S. Cl.
CPC .............. *B01D 3/008* (2013.01); *B01D 3/20* (2013.01); *B01D 53/185* (2013.01); *B63J 4/00* (2013.01);
(Continued)

(58) Field of Classification Search
CPC ........ B01D 3/008; B01D 3/20; B01D 53/185; B01D 53/1475; B01D 2258/0283; B63J 4/00
(Continued)

(56) References Cited

U.S. PATENT DOCUMENTS 1,738,870 A * 12/1929 Cox ........................ B01D 3/22
261/114.1
4,820,456 A * 4/1989 Kiselev .................... B01D 3/22
261/111
(Continued)

FOREIGN PATENT DOCUMENTS

FR      2989595 A1    10/2013

OTHER PUBLICATIONS

International Search Report dated Jan. 24, 2019 issued in corresponding PCT/EP2018/083120 application (2 pages).

*Primary Examiner* — Charles S Bushey
(74) *Attorney, Agent, or Firm* — Millen White Zelano & Branigan, PC; Brion P. Heaney

(57) ABSTRACT

A distributor tray (100) for a column for contact between a gas (G) and a liquid (L) is provided wherein the distributor tray has a plurality of compartments defined on one face of the tray by secant partitions (104) which are perforated (105) to allow the flow of liquid between adjacent compartments. Each compartment includes at least one passage of the liquid through the tray or a chimney (102) projecting from the tray for the exclusive passage of the gas (G) through the tray. The shape of the chimney is identical to the shape of the compartment containing it, and the chimney has an internal volume at least equal to the volume of the compartment containing it.

23 Claims, 5 Drawing Sheets

(51) Int. Cl.
  *B01D 3/20* (2006.01)
  *B63J 4/00* (2006.01)
  *B01D 53/14* (2006.01)
(52) U.S. Cl.
  CPC .. *B01D 53/1475* (2013.01); *B01D 2258/0283* (2013.01)
(58) Field of Classification Search
  USPC .......................................... 261/97, 110, 113
  See application file for complete search history.

(56) References Cited

U.S. PATENT DOCUMENTS

| | | | | |
|---|---|---|---|---|
| 5,518,667 A | * | 5/1996 | Lehman | B01D 3/008 261/97 |
| 5,984,282 A | * | 11/1999 | Armstrong | B01J 19/32 261/112.1 |
| 6,149,136 A | | 11/2000 | Armstrong et al. | |
| 6,395,138 B1 | * | 5/2002 | Darredeau | F25J 3/04987 202/83 |
| 6,907,751 B2 | * | 6/2005 | Kalbassi | F25J 3/04987 261/19 |
| 9,120,064 B2 | * | 9/2015 | Horoun | B01F 23/214 |
| 9,186,600 B2 | * | 11/2015 | Alzner | B01D 3/324 |
| 9,592,468 B2 | | 3/2017 | Haroun et al. | |
| 2013/0113128 A1 | | 5/2013 | Mzner et al. | |
| 2013/0277868 A1 | | 10/2013 | Haroun et al. | |
| 2016/0082364 A1 | * | 3/2016 | Haroun | B01D 3/324 261/113 |
| 2016/0107099 A1 | * | 4/2016 | Haroun | B01D 53/185 261/114.5 |
| 2016/0175733 A1 | * | 6/2016 | Haroun | B01D 53/185 261/113 |
| 2021/0146273 A1 | * | 5/2021 | Fourati | B01D 1/0005 |

* cited by examiner

DISTRIBUTOR TRAY WITH COMPARTMENTS AND GAS RISERS OF THE SAME SHAPE FOR AN OFFSHORE GAS/LIQUID CONTACT COLUMN

FIELD OF THE INVENTION

The present invention relates to the field of trays for gas/liquid contact columns, and more particularly offshore columns used, notably, in units for gas processing, $CO_2$ capture, gas dehydration or distillation.

GENERAL CONTEXT

Offshore units for gas processing or $CO_2$ capture by amine scrubbing comprise columns for the absorption and regeneration of fluids which may be liquid or gaseous. These absorption and regeneration columns operate with a countercurrent or co-current gas/liquid flow, and are installed on boats, floating barges or offshore platforms, for example those of the type known as FPSO (Floating Production, Storage and Offloading) or FLNG (Floating Liquefied Natural Gas). Distillation columns or gas dehydration columns are also installed on floating barges.

In the present description, these columns for exchange of material and/or heat between a gas and a liquid are denoted without distinction as gas/liquid exchange columns or gas/liquid contact columns.

The columns used in these offshore gas processing, $CO_2$ capture, distillation or gas dehydration units usually operate on the principle of a material and/or heat exchange between the gas and the fluid, which both flow in the columns.

For removing contaminants present in the gas, such as $CO_2$, hydrogen sulfide ($H_2S$), carbonyl sulfide (COS) and water by methods of gas scrubbing with liquid, vertical gas/liquid contact columns are generally used, these columns scrubbing an ascending gas current flowing in countercurrent with a descending liquid flow. Thus, the contaminants of the gas are retained by the liquid during the rise of the gas in the column with variable absorption rates. In the context of the elimination of contaminants from a gas, the term "vertical gas/liquid contact column" is also taken to mean regeneration columns, in which the (liquid) solvents loaded with contaminants are purified by contact with a gas, which promotes the extraction of the contaminants present in the contaminant-loaded solution. The units are generally composed of two gas/liquid contact columns, one of which is used for the absorption of contaminants, such as acid compounds in gaseous form, by the solvent which flows along the absorption column, also called the "absorber", while the other (the "regenerator") is used for regenerating the rich solvent, that is to say the solvent containing the contaminants carried out of the absorber, for example by applying heat to bring said solvent to the boiling point, so as to fully purify the solvent which is then re-used in the absorber. This regenerated solvent is also known as depleted solvent.

There exists a great variety of types of gas/liquid contact columns.

FIG. 1 shows a possible embodiment of a gas/liquid contact column used in a gas processing unit, for example for the absorption of acid compounds contained in the gas by the liquid, which is an aqueous solution of amine(s). This column is a vertical gas/liquid contact column comprising contact internals of the random packing and/or structured packing type, used in the form of a plurality of beds and comprising means for the intermediate redistribution of the liquid flow between the packing beds.

Packing known as random and packing known as structured form the two major classes of packing available at present. A packing of the random type is formed by a multiplicity of single solid elements, possibly identical and usually of moderate size (of the order of a centimeter), placed in a random manner within the contactors, while a packing of the structured type is usually formed by metal plates shaped and arranged in a particular way.

As represented in FIG. 1, the gas/liquid contact column 1 contains random and/or structured packing disseminated in several packing beds 7. Each packing bed corresponds to an absorption section 6 of the column in which the heat and/or material exchange is preferably carried out by bringing the liquid L and the gas G into contact within the packing. The contact column 1 receives the gaseous fluid gas $G_{FA}$ to be processed, containing acid compounds to be eliminated, through a first inlet at the column bottom, and receives the depleted solvent $L_{SP}$ (liquid amine solution) through a second inlet at the column top. The gaseous fluid to be processed $G_{FA}$ is usually introduced at the column bottom with the aid of a gas distributor 2 which enables the velocity profile of the ascending gas throughout the lower section of the packing bed 7 to be made as uniform as possible, in order to improve the operating performance of the column. The contact column 1 delivers the processed gaseous fluid $G_{FT}$, purified of some of the acid compounds, through a first outlet at the column top, and delivers the rich solvent $L_{SR}$, loaded with some of the acid compounds contained in the gaseous fluid to be processed, through a second outlet at the column bottom. The transfer of the acid compounds from the gaseous fluid to the liquid solvent is carried out by bringing the descending liquid phase and the ascending vapour phase into intimate contact within the column, at the packing beds 7. The packing beds 7 are composed of solid elements which exhibit a high contact surface area, over which the liquid is uniformly disseminated and flows downwards, which favours the contact with the ascending vapour phase, and thus makes it possible to efficiently transfer material and/or heat between the two fluids.

For all the types of packing, in order to have available the entire surface area developed by the transfer internal, it is advisable for each of the streams moving about countercurrentwise to flow in as uniform a manner as possible over the whole of the section of the column, and contact internals of the column. For this purpose, the depleted solvent SP, at the column top, is injected uniformly over the cross section of the top packing bed 7, using a liquid distributor 3, and the gas to be processed $G_{FT}$ is introduced at the bottom of the contactor, using the gas distributor 2. Usually, the gas distributor 2 placed at the bottom of the column also collects the liquid $L_{SR}$, which can subsequently be extracted at the column bottom 1. The liquid $L_{SR}$ is usually collected in a liquid collection area provided on the gas distributor 2, said area being conventionally connected to the bottom of the column by connectors opening into a liquid guard area from which the liquid is drawn out from the column 1.

The column 1 also comprises a plurality of liquid collecting and redistribution systems (4,5) between the packing beds 7. The column 1 shown here thus comprises two such liquid collecting and redistribution systems (4,5), each being placed between two packing beds 7, making it possible, on the one hand, to collect the descending liquid originating from the upper packing bed and to distribute said liquid over the lower packing bed, and, on the other hand, to uniformly distribute the gas originating from the lower liquid packing bed over the upper packing bed. This configuration is particularly well suited when a high gas/liquid contact height is required. These intermediate liquid collecting and redistribution systems, in this instance installed between two packing beds 7, can be of different types, such as, for example, systems comprising a liquid-collecting tray 4 comprising chimneys for the passage of the gas, combined with a distributor 5 comprising a vertical conduit emerging over a plurality of sprinklers (horizontal pipes equipped with orifices or nozzles) for the distribution of the liquid collected on the tray 4. Other types of intermediate liquid collecting and redistribution systems may be used, such as chimney trays, as illustrated in FIGS. 2 and 4. These chimney trays may also be used as liquid distributors 3 at column tops.

Trays equipped with chimneys may be of different types, and may be positioned in different configurations. Different variants of distributor trays are described, notably, in the following patent applications and patents: U.S. Pat. No. 6,338,774B, US2004020238A, U.S. Pat. Nos. 6,149,136A and 5,752,538A.

An example of a chimney tray is shown in FIG. 2. The tray 30 is an example of a standard liquid distributor tray used in such a column. The tray 30 comprises chimneys 32 for the distribution of the gas G, projecting from one face of the tray. The chimneys 32 are, for example, arranged on the tray at a given pitch P. The distribution of the liquid L takes place by the passage of the liquid into orifices 31 located on the tray 30 between the chimneys 32. Each chimney 32 allows the passage of the gas, in the countercurrent or co-current operating mode, from the lower part of the column toward the upper part of the column 1, or from the upper part toward the lower part. In FIG. 2, a countercurrent operating mode is shown (with the liquid L descending and the gas G ascending). The chimneys 32 rise perpendicularly to the tray 30. Each chimney 32 is formed by at least one wall which delimits an internal volume open on either side of the tray. The chimney 32 may have a cylindrical shape, as shown in FIG. 2, or may be formed of a plurality of walls and take the form of a parallelepiped. The chimney 32 may be equipped with a cap (not shown) positioned above the gas exhaust or inlet aperture of the chimney (in the countercurrent or co-current operating mode), to prevent the liquid from passing through the chimneys 32. This gas exhaust or inlet aperture may also be positioned so as to prevent the liquid from entering the chimney, by being positioned, for example, orthogonally to an axis Z passing through the chimneys in the direction of their height H. The purpose of the distributor tray 32 is to distribute the liquid L uniformly over a gas/liquid contactor 7 located underneath in the column 1, as shown in FIG. 1. Such a tray 30 may also serve to distribute the gas uniformly to the base of a gas/liquid contactor 7 located above said tray 30 in the column 1, in the case where the tray 30 is an intermediate device located between two gas/liquid contactors 7 (the function of the collecting and redistribution device (4, 5) of FIG. 1).

In the case where the gas/liquid contact columns in question are offshore, particularly placed on floating structures, for example, of the boat, platform or barge type, these structures are sensitive to sea swell. Consequently, the equipment installed in these columns, notably the gas/liquid distributor trays, are subject to swell movements having up to six degrees of freedom ("yaw, pitch, roll, heave, rocking, thrust").

For guidance, the angle associated with a combination of the pitch and roll oscillations is of the order of +/−5°, with a period varying from 15 to 20 s. The orders of magnitude of the longitudinal, transverse and vertical accelerations encountered in the column vary, respectively, between 0.2/0.7/0.2 m/s$^2$ at 6 m above the deck on which the column is positioned and 0.3/1.2/0.3 m/s$^2$ at 50 m above the bridge.

In these conditions, the operation of the conventional distributor trays equipped with chimneys, as illustrated in FIG. 2, may considerably disrupted. For the sake of simplicity, the gas chimneys of the tray 30 are not shown in FIG. 3. In fact, the operation of these distributors is mainly gravity-based, and a liquid guard of uniform height "h" must be established on the distributor tray. The square of the velocity of the passage of the liquid through the orifices 31 of the tray 30 is proportional to the height of the liquid guard ($U_L^2 \propto gh$). When the tray 30 is tilted under the effect of the swell, as shown in FIG. 3, the height of the liquid guard is no longer uniform over the distributor tray ($h_1 > h_2$, $h_1$ and $h_2$ being, respectively, the liquid guard heights at two diametrically opposite positions on the tray 30), creating an imbalance in the distribution of the liquid entering the gas/liquid contactor 7 in the column 1 ($U_{L1} >> U_{L2}$, $U_{L1}$ and $U_{L2}$ being, respectively, the velocities of distribution of the liquid at the same two diametrically opposite positions on the tray). The distribution quality and therefore the efficiency of the column are seriously affected. If this distribution of the liquid is not controlled, it may substantially degrade the performance of the column. A large liquid guard (about 0.6 m, depending on the diameter of the column) would be required to compensate for these effects, resulting in an increase in overall size and weight that is undesirable for offshore structures.

To avoid problems of this kind, liquid distribution elements with low sensitivity to imperfect horizontality have been used. These distributors usually consist of a separate collector and distributor, connected by one or more relatively long vertical conduits so that the distributor remains under load regardless of the swell conditions encountered. An example of such a system in which the collection of liquid is dissociated from its distribution is shown in FIG. 4. The liquid collector tray 40 comprises chimneys 42 for the passage of the gas. The system for the distribution of the liquid comprises at least one vertical conduit 41 connecting the tray collector 40 to a plurality of sprinklers 43 (horizontal tubes provided with orifices or nozzles). For offshore floating conditions, it is usually this type of liquid collecting and redistribution system that is preferred, between two packing beds for example, essentially for two reasons: (1) the effects of the oscillations of the liquid in the central connector are minimized, and (2) a uniform distribution toward the lower bed is desired. The vertical conduit(s) 41 are relatively long to enable the distributor system to create a sufficient static head, regardless of the conditions of tilt caused by the swell, and to provide the motive force to the distributor. In fact, the vertical conduit is designed so that the variation of the liquid height due to imperfect horizontality is considerably smaller than the height of the liquid conduit supplying the distribution system. Patent application US2004020238, for example, gives a detailed description of such a liquid distribution system. These distributors, therefore, generally have a low sensitivity to swell effects and provide high-quality distribution, but have very large overall dimensions: they may have a height of several meters in some cases.

Another solution to these problems is described in patent applications FR 2771018 A and FR 2771019 A. It consists in using two distributors (primary and secondary). Each distributor is divided into a plurality of compartments into which the liquid is distributed. Owing to these compartments, the liquid is better distributed when the column is tilted. However, this solution still has large overall dimensions, because it requires two distributors. Furthermore, since the compartments do not communicate with one another, the distribution of the liquid in the compartments is not balanced.

Yet another known solution, described in patent FR 2989595 B, consists in using a liquid distributor tray as shown in FIG. 5. Such a tray 50 is compartmented, each compartment 53 comprising a cylindrical chimney 52 for the passage of the gas and at least one means for distributing the liquid, of the orifice type 51 or the chimney type. The compartments comprising gas chimneys and passage means for the liquid take the form of right-angle parallelepipeds. The compartments act as "barrier" when the tray is tilted. Thus a relatively uniform liquid guard is maintained, even with a high degree of tilt. Additionally, a flow of liquid is allowed between the compartment 53 because of the partitions 54 forming said compartments, which have perforations 55, preferably located at the bases of the partitions. Thus the liquid can flow over the whole surface of the tray 50, allowing good radial dispersion of the liquid, thus providing high-quality distribution of the liquid over the gas/liquid contactor 7.

However, the design and production of such a tray may pose a problem, notably because of the cylindrical shape of the chimneys that are inserted into compartments in the form of right-angle parallelepipeds. For good distribution of the gas, the chimneys are present in many compartments, removing some of the working surface area that is required for a good distribution of the orifices 51 and for providing a good distribution of the liquid. To minimize this inconvenience, the chimneys may be installed near the walls of the compartments, but in this case it is not easy to connect the cylindrical chimneys if they are in contact with the walls 54. This requires numerous weld points and greatly complicates the production process, with an impact on cost. FIG. 6 shows a partial view of an example of a compartment comprising a chimney 52, surmounted by a cap 57 to prevent the passage of liquid through the chimney, and orifices 51 for the passage of the liquid through the tray. If the cylindrical chimneys are installed in the compartments without contact with the walls 54, they will obstruct a large number of liquid passage orifices 51, to the detriment of the quality of liquid distribution. These problems of design and production will be exacerbated for trays with large diameters, for example those that are 4 or 5 meters in diameter, comprising numerous compartments and chimneys.

The present invention is an improvement of the tray described in patent FR 2989595 B, and is intended, notably, to simplify the design and manufacture of the tray while providing a good distribution of the liquid via the liquid passage means, which are, for example, orifices.

OBJECTIVES AND SUMMARY OF THE INVENTION

The objective of the present invention is, notably, to provide a distributor tray (for liquid and gas) for a column for heat and/or material exchange between a gas and a liquid, with a simple structure, and providing a high quality of distribution of the liquid and a good dispersion of the liquid over the tray, even when there is considerable tilting of the tray caused by the marine environment.

The present invention is also intended to simplify the design and manufacture of a tray comprising compartments provided with chimneys for the passage of the gas through the tray and means of passage for the liquid, suitable for use in an offshore column for heat and/or material exchange between a gas and a liquid.

Thus, in order to achieve at least one of the aforementioned objectives, among others, the present invention proposes, according to a first aspect, a distributor tray for a column for heat and/or material exchange between a gas and a liquid, comprising secant partitions delimiting a plurality of compartments on a face of the tray, said partitions having perforations to permit the flow of some of the liquid between adjacent compartments, each compartment comprising at least a means for the passage of the liquid through said tray or a chimney projecting from the face of said tray for the exclusive passage of said gas through said tray, said tray having a plurality of means for the passage of the liquid and a plurality of chimneys, and wherein the shape of said chimney is identical to the shape of the compartment containing it and said chimney has an internal volume at least equal to the volume of the compartment containing it.

According to one embodiment of the invention, each chimney occupies a single compartment.

According to one embodiment of the invention, each chimney occupies a plurality of adjacent compartments.

Preferably, each chimney occupies four adjacent compartments.

According to an embodiment of the invention, the compartments are of the same size and the same shape.

According to an embodiment of the invention, each chimney is surrounded by at least three compartments adjacent to said chimney, among which the liquid flows via the perforated partitions.

According to an embodiment of the invention, each chimney is surrounded by at least three compartments adjacent to said chimney, between which the liquid flows via the perforated partitions.

According to an embodiment of the invention, the partitions are composed of two series of partitions, the partitions of each series being parallel to one another and secant to the partitions of the other series.

According to an embodiment of the invention, the chimneys have a cross section of square, rectangular, diamond, hexagonal or trapezoidal shape, preferably square.

According to an embodiment of the invention, the chimneys are distributed regularly over the face of the tray at a first given pitch, preferably a triangular or square pitch.

Advantageously, the perforations are located at the bases of the partitions.

According to an embodiment of the invention, the perforations of two parallel partitions delimiting the same compartment are not aligned.

According to an embodiment of the invention, means for the passage of the liquid are orifices located on the tray, which are preferably distributed regularly in each compartment at a second given pitch, preferably a triangular or square pitch.

According to an embodiment of the invention, the liquid passage means are chimneys for the passage of the liquid through the tray, equipped with at least one perforation, said liquid passage chimneys projecting from a face of said tray.

According to an embodiment of the invention, the tray further comprises a dispersion system located under the other face of the tray, the dispersion system comprising a set of sprinklers or perforated conduits positioned parallel to one another.

According to a second aspect, the present invention proposes an offshore column for heat and/or material exchange between a gas and a liquid, comprising at least one gas/liquid contactor bringing the gas and the liquid into contact, at least a first inlet for liquid, at least a second inlet for gas, at least a first outlet for a gaseous fluid and at least a second outlet for a liquid fluid, the column comprising a distributor tray according to the invention for the distribution of the liquid over the gas/liquid contactor and the distribution of the gas.

According to a third aspect, the present invention proposes a unit for gas processing or $CO_2$ capture by scrubbing the gas using an absorbent solution, the absorbent solution containing, notably, amines, the unit comprising at least one offshore column according to the invention to allow the exchanges between the gas and the absorbent solution.

According to a fourth aspect, the present invention proposes a unit for distillation of a liquid or dehydration of a gas, comprising at least one offshore column according to the invention to allow the exchanges between the gas and the liquid.

According to a fifth aspect, the present invention proposes an offshore floating barge, notably for the recovery of hydrocarbons, comprising a gas processing and/or $CO_2$ capture unit according to the invention or a distillation and/or dehydration unit according to the invention.

Other subject matters and advantages of the invention will become apparent on reading the description which follows of specific exemplary embodiments of the invention, given by way of nonlimiting examples, the description being made with reference to the appended figures described below.

In the figures, the same references denote identical or analogous elements.

DESCRIPTION OF THE INVENTION

Figure 7:
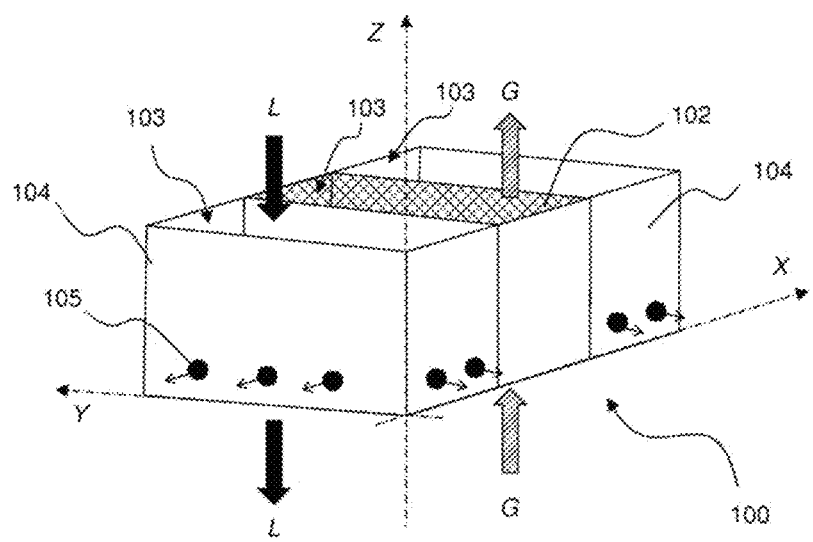
FIG. 7 is a schematic illustration of a 3D view of a part of a tray according to another embodiment of the invention.
Figure 8:
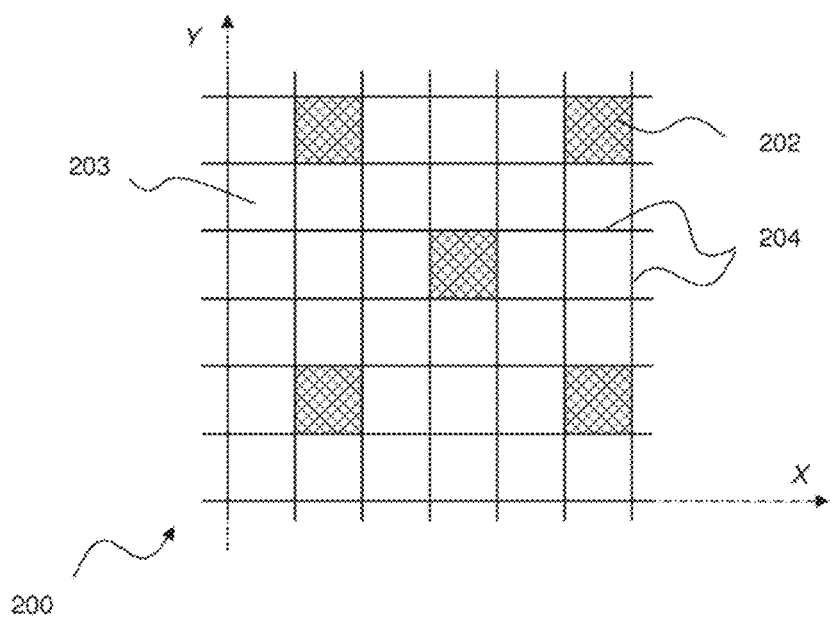
FIG. 8 is a schematic illustration of a top view of a part of a tray according to an embodiment of the invention.
Figure 9:
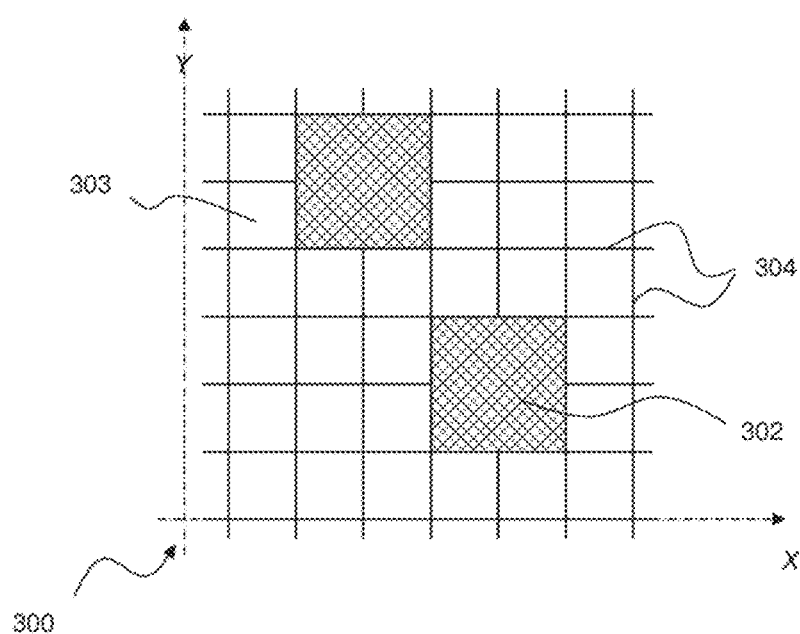
FIG. 9 is a schematic illustration of a top view of a part of a tray according to another embodiment of the invention.

The following detailed specification of the tray according to the invention refers, notably, to FIGS. 7 to 9, which illustrate different nonlimiting embodiments.

FIG. 7 illustrates in particular, in a schematic manner, a part of a tray according to an embodiment of the invention.

The tray 100 according to the invention is a gas distributor tray for a column for heat and/or material exchange between a gas G and a liquid L. The tray according to the invention has a gas distribution function and a liquid distribution function. In this sense, reference will be made in the rest of the description to a "distributor" tray to denote a tray having these two functions of liquid and gas distribution.

The distributor tray 100 comprises two faces, namely an upper face and a lower face. The face of the tray that is oriented toward the top of the exchange column is called the upper face of the tray 100. Conversely, the lower face of the tray is that which is oriented toward the bottom of the column, through which the gas enters, in a countercurrent operating mode of the column with an ascending gas and a descending liquid.

In FIG. 7, the tray is shown in its position of use within a gas/liquid contact column, that is to say positioned horizontally with the upper face, in the plane (XY) coinciding with a horizontal plane, oriented toward the top of the column. Conventionally, the tray 100 is inscribed in a cylinder whose diameter $\phi$ is substantially equal to that of the gas/liquid contact column. For example, and in a non-limiting manner, the diameter of the gas/liquid contact column may be between 1 m and 8 m, and is commonly between 2 m and 5 m.

Figure 5:
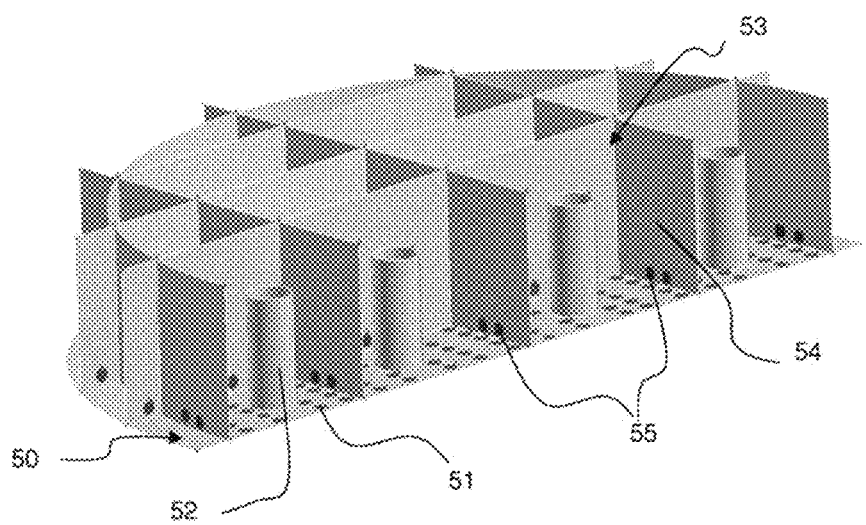
FIG. 5, described above, is a partial perspective view of an example of a compartmented chimney tray according to the prior art.
Figure 6:
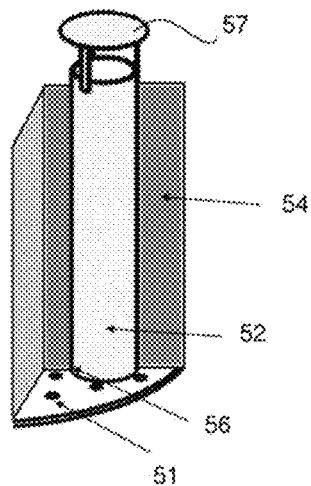
FIG. 6, described above, illustrates an example of a tray according to the prior art, of the compartmented chimney tray type as illustrated in FIG. 5.

In the same way as the tray according to the prior art illustrated in FIG. 5, the tray 100 according to the invention comprises secant partitions 104 delimiting, on one face of the tray 100, namely the upper face, a plurality of compartments 103. Preferably, this is a plurality of compartments of the same size and shape, but this does not exclude the possibility that, on the periphery of the tray, and notably in the case of a cylindrical column, other compartments may be provided which are not of the same size and shape. The partitions 104 forming the compartments 103 have perforations 105 for allowing some of the liquid to flow between adjacent compartments 103. "Adjacent compartments" is taken to mean compartments having two partitions in common. Preferably, the partitions 104 are composed of two series of partitions, the partitions of each series being parallel to one another and secant to the partitions of the other series, as shown in FIG. 7.

According to the invention, each compartment comprises at least one means for the passage of the liquid through the tray 100, as well as a chimney 102 projecting from the face of the tray 100 for the exclusive passage of said gas through said tray 100.

The tray 100 according to the invention has a plurality of means for the passage of the liquid and a plurality of chimneys 102, in order to provide both a gas distribution function and a liquid distribution function.

The partitions 104 generating the compartments 103 serve as "barriers" to the liquid contained in the compartments forming the liquid passage means, notably when the tray is tilted. Thus a relatively uniform liquid guard is maintained, even with a high degree of tilt. A good quality of distribution of the liquid over the gas/liquid contactor is thereby ensured. The interface between the gas and the liquid is called the liquid guard. The height of the liquid guard corresponds to the level of the liquid relative to the upper face of the tray. Additionally, the area on which the liquid flows is called the liquid flow area; it is the surface area formed by the compartments comprising the liquid passage means on the upper face of the tray, between which the liquid can flow because of the perforations 105 of the partitions 104.

Because of these perforations 105, some of the liquid L can flow between adjacent compartments provided with the liquid passage means, and can preferably flow between said compartments distributed uniformly over the whole of the surface of the distributor tray 100, thus providing good radial dispersion of the liquid. The perforations 105 may be circular, oblong, rectangular or of other shape. However, the surface area of the perforations 105 may, preferably, remain small relative to the surface area of the partitions, so that the partitions 104 continue to perform their main function, namely to limit the quantity of fluid flowing over the tray, to ensure a good uniformity of the height of the liquid on the tray. Additionally, to prevent a linear flow of the liquid and ensure a good radial dispersion of the liquid, the perforations 105 of two parallel partitions of a compartment 103 are not aligned (or coaxial); that is to say, a straight line passing through the centres of the perforations of two parallel partitions is not parallel to one of the partitions of the compartment 103. Advantageously, the perforations 105 are placed at the bases of the partitions 104, that is to say in the lower part of the partitions 104 near the upper face of the tray from which the chimneys project, to facilitate the flow of the liquid; the perforations 105 are preferably arranged so as to be located below the height of the liquid guard.

The perforations are present only between adjacent compartments having means for the passage of the liquid through the tray, and not between a compartment having a chimney adjacent to a compartment having liquid passage means.

The number of compartments (and therefore the number of partitions) may be dependent on the diameter of the tray. Preferably, a large tray is more compartmented than a smaller tray. By way of nonlimiting example, the tray may have between 4 and 150 compartments.

Preferably, each chimney 102 is surrounded by at least three compartments adjacent to said chimney 102, between which the liquid flows via the perforated partitions. More preferably, each chimney 102 is surrounded on all sides by compartments adjacent to said chimney 102, between which the liquid flows via the perforated partitions. In this way it is possible to provide a flow of the liquid over the whole of the face of the tray that is not occupied by the chimneys.

The means for the passage of the liquid through the tray are not shown in FIGS. 7 to 9. They may be orifices, such as the orifices 51 shown in the prior art tray of FIG. 5. In this case, the orifices are preferably distributed regularly in each compartment at a given pitch, preferably a triangular or square pitch. There may also be chimneys for the passage of the liquid, each equipped with at least one perforation (or at least a row of perforations), the liquid passage chimneys projecting from one of the faces of the tray 100.

The chimneys 102 allow the exclusive passage of the gas G through the tray 100. Plurality of chimneys is understood to mean at least two chimneys. The number of chimneys is variable and depends on the design of the tray, particularly on parameters such as the size of the tray, the desired aperture ratio, the volume of the collecting area, etc. Purely for guidance, without any limitation, the tray 100 according to the invention may have between 2 and 100 chimneys 102.

An axis Z passes through the chimneys 102 in the direction of their height, this axis coinciding with the vertical when the tray is in a horizontal position in the column. The gas G passes through the chimney 102 in the direction of its height, along this axis Z. The other dimensions of the chimney, for example its length l and its width L in the case of a chimney of right-angle parallelepiped shape as shown in FIG. 7, are defined in the plane (XY) orthogonal to the axis Z, formed by a portion of the tray supporting the chimneys 102. This plane is a horizontal plane when the tray is in position in a column.

Each chimney 102 comprises an internal volume opening on either side of the tray 100, said volume being delimited by a plurality of walls forming the chimney 102. Exhaust aperture and inlet aperture denote, respectively, the aperture of the chimney through which the gas, having passed through the chimney, escapes, this aperture being located typically at the top of the chimney projecting from the upper face of the tray for a column operating in countercurrent (ascending gas) mode, and the aperture of the chimney through which the gas enters, typically located at the base of the chimney projecting from the upper face of the tray for a column operating in countercurrent (ascending gas) mode.

Each chimney 102 may be surmounted by a cap (not shown) to prevent the liquid from entering the chimney 102. The cap is then raised above the top of the chimney so as to leave space for the passage of the gas G.

Preferably, the chimneys 102 are distributed over the tray 100 in a regular manner, at a given pitch, to provide uniform distribution of the gas. For example, the chimneys are distributed over the upper face of the tray at a triangular or square pitch.

Preferably, the number of chimneys on the tray is less than the number of compartments comprising the liquid passage means.

The height of the chimneys 102 may be greater than that of the partitions forming the compartments. Thus the chimneys may be higher than the compartments containing the liquid passage means.

According to the invention, the shape of the chimney 102 is identical to the shape of the compartment 103 containing it, and the internal volume of the chimney is at least equal to that of the compartment containing it.

Since the chimneys match the shape of the compartments in this way, it becomes easier to design their installation on the tray and to construct the latter, with allowance for other design and manufacturing constraints, notably the arrangement of the liquid passage means, which must allow a good quality of distribution of the liquid.

This makes it possible, notably, to avoid the problems of connection between chimneys and compartments encountered in the prior art, and therefore facilitates the manufacture of the tray.

This also facilitates the design of the tray, in that it is possible to optimize the uniformity of the velocity profile of the gas at the outlet of the chimneys, using an additional flexibility in the installation of the chimneys on the tray provided by the identity of shape between the compartments and the chimneys, without affecting the distribution of liquid in the compartments. It should be borne in mind that the velocity profile of the gas at the outlet of the gas chimneys of the tray is an essential parameter for the correct operation of the gas/liquid contactor, for example a packing bed, over which the gas is distributed. Thus the present invention makes it possible to produce a tray with high performance in terms of the quality of gas and liquid distribution.

The compartments of the distributor tray 100 are in the shape of right-angle parallelepipeds. The chimneys 102 are also in the shape of right-angle parallelepipeds. The cross section of said chimneys 102 is therefore rectangular, as is that of the compartments 103. The chimneys 102 are, for example, elongated along a longitudinal axis Y orthogonal to the axis Z. The parallelepipedal, preferably right-angle parallelepipedal, shape allows a large aperture for the passage of the gas, notably by comparison with known cylindrical chimneys, making it possible to limit pressure drops.

The distributor tray according to the invention may comprise compartments having a shape other than that shown in FIG. 7. In particular, the distributor tray according to the invention may comprise compartments, and therefore chimneys, having a cross section of square, rectangular, diamond, hexagonal or trapezoidal shape. Preferably, the chimneys of the distributor tray according to the invention have a cross section of square shape, as in the embodiments of the tray according to the invention shown in FIGS. 8 and 9.

By way of nonlimiting example, the height of the chimneys may, for example, be between 0.15 m and 1.00 m, and preferably between 0.3 m and 0.6 m.

To manufacture the tray, and particularly to determine the size of the compartments 103, the following steps may be taken:

a) an imbalance index IQ for said tray 100 is defined:

$$IQ(\%) = \frac{U_{L1} - U_{L2}}{(U_{L1} + U_{L2})/2} 100$$

Where $U_{L1}$ and $U_{L2}$ are the velocities of the liquid leaving the tray at two diametrically opposite ends of the tray;

b) a maximum imbalance index of said tray and a maximum tilt angle θ of the tray 100 relative to the horizontal are chosen;

c) a distance L1 between two consecutive parallel partitions and a length L2 of a diagonal of a compartment are determined, enabling the maximum imbalance index to be found; and d) the partitions are positioned to conform to the lengths L1 and L2.

FIG. 8 is a diagram showing a part of a tray according to an embodiment of the invention, in a top view. This therefore concerns the upper face of the tray. For the sake of simplicity, certain elements such as the liquid passage means are not shown. The tray 200 according to this embodiment is identical in every way to that described with reference to FIG. 7, except in that the compartments 203 formed by the partitions 204, and therefore the chimneys 202, have a square cross section. The compartments of the tray thus form a checkerboard structure, having rows along the X and Y axes. Additionally, according to this embodiment, each chimney 202 occupies a single compartment 203. In other words, the internal volume of each chimney 202 is equal to the volume of the compartment 203 containing it. Preferably, according to this embodiment, the chimneys 202 are distributed uniformly over the upper face of the tray, for example in a regular pattern determined by a triangular pitch. Thus the tray 200 comprises one chimney 202 for every 4 compartments along the X axis and the Y axis, each chimney 202 being surrounded on all sides by compartments containing liquid passage means only, and communicating with one another via perforations in the partitions 204, so as to create a liquid flow area distributed uniformly over the face of the tray 200. The chimneys 202 are also spaced apart by a row without chimneys, that is to say a row formed only by liquid compartments, along the X axis and also along the Y axis.

FIG. 9 is a diagram showing a part of a tray according to an embodiment of the invention, in a top view. This therefore concerns the upper face of the tray. The tray 300 according to this embodiment is identical in every way to that described with reference to FIG. 8, except in that each chimney 302 occupies a plurality of adjacent compartments 303, for example four adjacent compartments as shown. "4 adjacent compartments" is taken to mean that the compartments are adjacent in pairs. In other words, the internal volume of each chimney 302 is equal to the volume of the four compartments 303 containing it. As in the tray 200, the compartments of the tray 303 formed by the partitions 304, and therefore the chimneys 302, have a square cross section. A checkerboard structure is thus formed, having rows along the X and Y axes. Preferably, according to this embodiment, the chimneys 302 are distributed uniformly over the upper face of the tray, for example in a regular pattern determined by a triangular pitch. Only the full chimneys, that is to say those occupying 4 drawn compartments, are shown in FIG. 9. Thus the tray 300 comprises a chimney 302 occupying 4 adjacent compartments, forming a square, every 4 compartments along the X axis and every 6 compartments along the Y axis, each chimney 302 being surrounded on all sides by compartments containing liquid passage means only, and communicating with one another via perforations in the partitions 304, so as to create a liquid flow area distributed uniformly over the face of the tray 300. The chimneys 302 are also spaced apart by at least one row without chimneys, that is to say a row formed only by liquid compartments, along the X axis and also along the Y axis.

The invention also relates to a column for material and/or heat exchange between a gas G and a liquid L, in which the two fluids are brought into contact by means of at least one gas/liquid contactor. Such a gas/liquid contactor is preferably a bed of structured or random packing, as defined above. It can also be any other means for bringing gas and liquid into contact which makes possible an exchange of material and/or of heat, such as trays.

Figure 1:
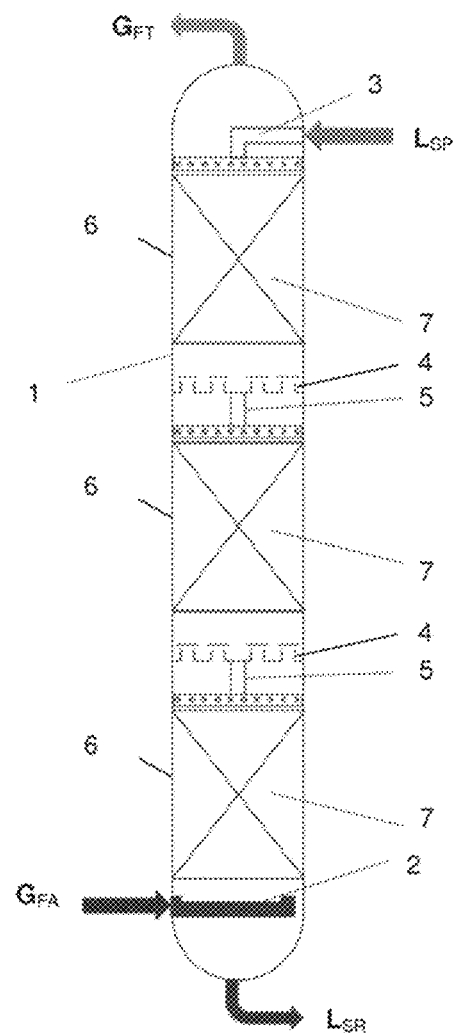
FIG. 1, described above, is a diagram illustrating a particular case of a gas/liquid contact column for the absorption of acid compounds contained in a gas by an aqueous amine solution, in the context of gas processing or $CO_2$ capture, equipped with a tray according to the prior art or according to the invention.
Figure 2:
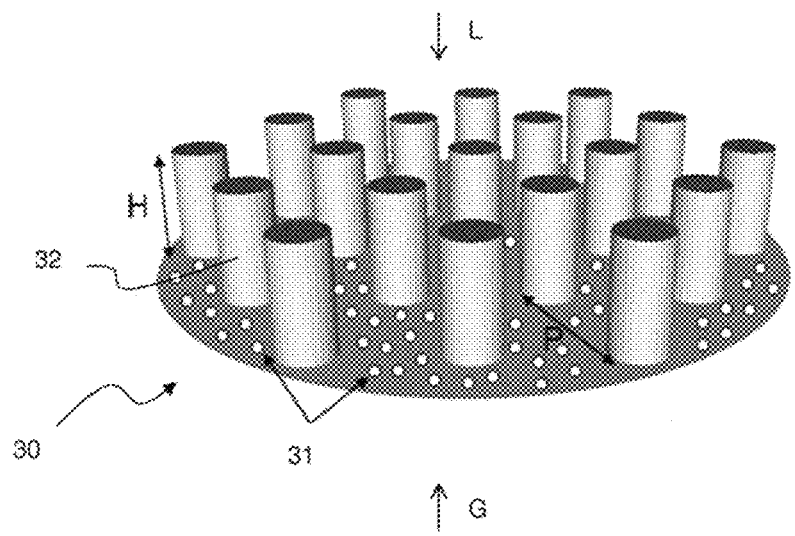
FIG. 2, described above, illustrates a chimney tray according to the prior art for distribution of the liquid and the gas.
Figure 3:
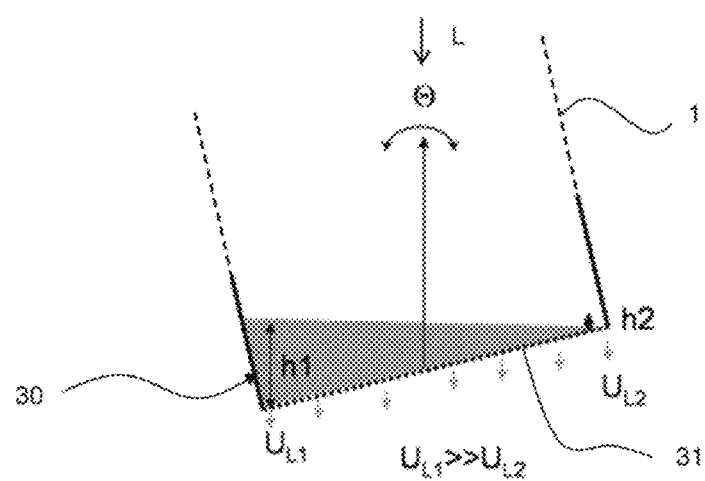
FIG. 3, described above, illustrates the chimney tray according to the prior art of FIG. 2, shown in a tilted position.
Figure 4:
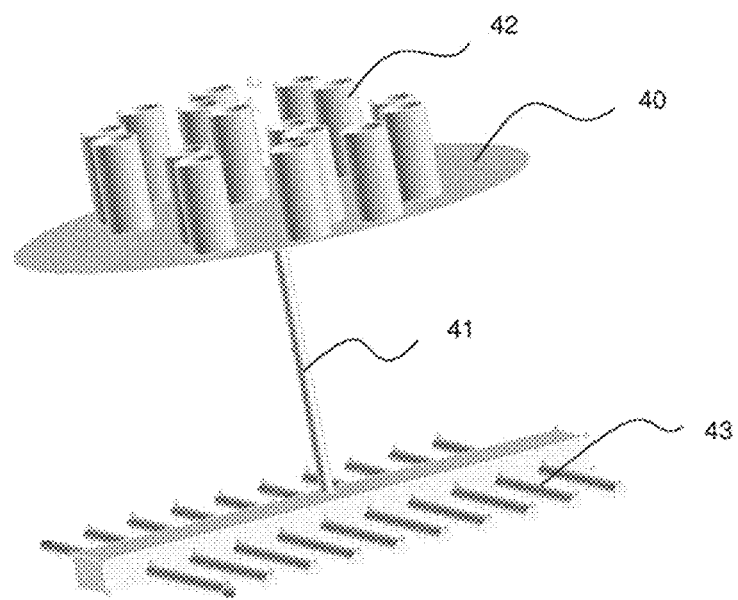
FIG. 4, described above, illustrates an example of a liquid collecting and distribution system according to the prior art, for use between two packing beds of a gas/liquid contact column, comprising a liquid collector tray with gas chimneys connected to a liquid distributor formed by sprinklers.

The column according to the invention may be a column as described with reference to FIG. 1, for example one suitable for a method of absorption of acid compounds such as $CO_2$, $H_2S$, COS, carbon disulfide ($CS_2$), sulfur dioxide ($SO_2$) and mercaptans (RSH) such as methyl mercaptan ($CH_3SH$), ethyl mercaptan ($CH_3CH_2SH$) and propyl mercaptan ($CH_3CH_2CH_2SH$), contained in a gas to be processed, by the liquid which is an aqueous solution of amine(s). The column can thus comprise, without exhaustively taking up again the description which has already been given above of such a column, at least one inlet for a liquid (known as "depleted solvent") positioned at the top of the column, at least one inlet for a gas to be treated at the bottom of the column, at least one outlet for the treated gas at the top of the column and at least one outlet for the liquid enriched in contaminants which are initially present in the gas to be treated at the column bottom (known as "enriched solvent"). The column advantageously comprises at least one gas/liquid contactor 7, preferably a random or structured packing bed, and more preferably a structured packing bed, for bringing the gas to be processed into contact with the depleted solvent.

The column 1 comprises at least a first inlet for the liquid $L_{SP}$, at least a second inlet for the gas $G_{F4}$, at least a first outlet for a gaseous fluid $G_{F4}$ and at least a second outlet for a liquid fluid $L_{SR}$.

The column 1 further comprises a distributor tray as described above, surmounting said gas/liquid contactor 7, to allow a distribution of the liquid over said contactor 7 and a distribution of the gas.

Depending on the position of the tray in the column and the direction of flow of the fluids (of the co-current or countercurrent type), the gas may be distributed by the tray over said gas/liquid contactor (as in the case, for example, of a co-current descending gas/liquid flow), or may be distributed over another gas/liquid contactor surmounting the tray if the tray is positioned between two successive gas/liquid contactors in the column (as in the case, for example, of a countercurrent gas/liquid flow with the liquid descending in the column), or the gas may be distributed at the top of the column, above every section comprising a gas/liquid contactor, from where it may be discharged from the column.

Preferably, the column according to the invention operates in countercurrent mode, with a gas ascending and a liquid descending in the column.

The distributor tray according to the invention may be placed between two successive sections, namely a lower section and an upper section, each section comprising a gas/liquid contactor 7, typically a packing bed, thus allowing the distribution of the liquid L at the top of the gas/liquid contactor 7 of the lower section, and the distribution of the gas at the base of the gas/liquid contactor 7 of the upper section. It replaces the liquid collecting and redistribution system referenced (4,5) in FIG. 1.

The distributor tray according to the invention may also be placed at the top of the column, downstream of any gas/liquid contactor 7 (in the direction of an ascending gas in a column operating in countercurrent mode). It thus allows the liquid entering through the first inlet of the liquid $L_{SP}$ at the top of the column to be distributed over the section containing the gas/liquid contactor 7 in the highest position in the column.

Advantageously, the gas/liquid contactor 7 is a structured or random packing bed, and preferably a structured packing bed.

The distributor tray according to the invention may be associated with a dispersion system placed under the distributor tray, this dispersion system possibly being a set of sprinklers or perforated conduits placed in parallel under the distributor tray. This dispersion system can provide an even better dispersion of the liquid in the gas/liquid contactor.

Such an offshore column may be a column for the absorption or regeneration of a fluid, in which a gaseous fluid is brought into contact with a liquid fluid, used in a gas processing or $CO_2$ capture unit.

The absorption column brings a gas and a liquid into contact to absorb contaminants contained in the gas and produce a liquid enriched in said contaminants and a gaseous outflow depleted in said contaminants. The regeneration column brings a gas and a liquid into contact to regenerate a liquid containing contaminants and to produce a regenerated liquid depleted in contaminants and a gas enriched in said contaminants.

The invention also relates to a unit for gas processing or for capturing the $CO_2$ contained in the gas, by scrubbing the gas using an absorbent solution, containing amines for example. The unit comprises at least one offshore column 1 as defined above, for allowing exchanges between the gas and the absorbent solution.

"Gas processing" is conventionally taken to mean the elimination of acid compounds in gaseous form such as $CO_2$, $H_2S$, COS, $CS_2$, $SO_2$ and mercaptans (RSH) contained in a gas, and particularly those contained in a natural gas in a context of use of an offshore column.

"Capture of the $CO_2$ contained in a gas" is usually taken to mean the elimination of the $CO_2$ contained in a gas, for example that contained in a natural gas or combustion fumes in a context of use of an offshore column.

The tray according to the invention may also advantageously be used in an offshore liquid distillation column or an offshore gas dehydration column.

The invention thus also relates to a distillation or gas dehydration unit.

"Gas dehydration" is taken to mean the elimination of the water contained in a gas (the gas is "dried"), for example that contained in a context of use of an offshore column, by bringing the gas into contact with a liquid solvent such as glycol.

Finally, the invention relates to an offshore floating barge, of the FPSO or FLNG type for example, notably for hydrocarbon recovery. The barge comprises a gas processing and/or $CO_2$ capture unit as described above, for cleaning gases produced during hydrocarbon recovery. The barge may also comprise a distillation and/or gas dehydration unit as described above.

The invention claimed is:

1. A distributor tray for a column (100, 200, 300) for heat and/or material exchange between a gas (G) and a liquid (L), comprising:
   secant partitions (104, 204, 304) delimiting a plurality of compartments (103, 203, 303) on a face of the tray (100, 200, 300), said partitions (104, 204, 304) having perforations (105) to permit the flow of some liquid between adjacent compartments,
   each compartment (103, 203, 303) comprising at least a means for the passage of the liquid through said tray (100, 200, 300) or a chimney (102, 202, 302), or a portion of a chimney, projecting from said face of said tray (100, 200, 300) for the exclusive passage of said gas (G) through said tray (100, 200, 300),
   said tray having a plurality of means for the passage of the liquid and a plurality of chimneys (102, 202, 302), and
   wherein the shape of said chimney (102, 202, 302), or the portion of the chimney, is identical to the shape of the compartment (103, 203, 303) containing said chimney or the portion of the chimney, and said chimney (102, 202, 302) has an internal volume at least equal to the volume of the compartment (103, 203, 303) containing said chimney or portion thereof.

2. The tray as claimed in claim 1, wherein each chimney (102, 202) occupies a single compartment (103, 203).

3. The tray as claimed in claim 1, wherein each chimney (302) occupies a plurality of adjacent compartments (303).

4. The tray as claimed in claim 3, wherein each chimney (302) occupies four adjacent compartments (303).

5. The tray as claimed in claim 1, wherein the compartments (103, 203, 303) are of the same size and the same shape.

6. The tray as claimed in claim 1, wherein each chimney (102, 202, 302) is surrounded by at least three compartments (103, 203, 303) adjacent to said chimney (102, 202, 302) between which the liquid (L) flows via the perforated partitions (104, 204, 304).

7. The tray as claimed in claim 1, wherein each chimney (202, 302) is surrounded on all sides by compartments adjacent to said chimney (202, 302) between which the liquid (L) flows via the perforated partitions (204, 304).

8. The tray as claimed in claim 1, wherein said partitions (104, 204, 304) are composed of two series of partitions, the partitions of each series being parallel to one another and secant to the partitions of the other series.

9. The tray as claimed in claim 1, wherein the chimneys (102, 202, 302) have a cross section of square, rectangular, diamond, hexagonal or trapezoidal shape.

10. The tray as claimed in claim 1, wherein the chimneys (102, 202, 203) are distributed regularly over the face of the tray (100, 200, 300) at a first given pitch.

11. The tray as claimed in claim 1, wherein said perforations (105) are located at the bases of said partitions (104, 204, 304).

12. The tray as claimed in claim 1, wherein said perforations (105) of two parallel partitions (104, 204, 304) delimiting the same compartment (103, 203, 303) are not aligned.

13. The tray as claimed in claim 1, wherein said means for the passage of the liquid are orifices located on the tray (100, 200, 300).

14. The tray as claimed in claim 1, wherein the liquid passage means are chimneys for the passage of the liquid through the tray (100, 200, 300), equipped with at least one perforation, said liquid passage chimneys projecting from a face of said tray (100, 200, 300).

15. The tray as claimed in claim 1, further comprising a dispersion system located under the other face of said tray, said dispersion system comprising a set of sprinklers or perforated conduits placed parallel to one another.

16. An offshore column (1) for heat and/or material exchange between a gas and a liquid, comprising at least one gas/liquid contactor (7) bringing the gas and the liquid into contact, at least a first inlet for the liquid ($L_{SP}$), at least a second inlet for the gas ($G_{F4}$), at least a first outlet for a gaseous fluid ($G_{FT}$) and at least a second outlet for a liquid fluid ($L_{SR}$), said column (1) comprising a distributor tray (100, 200, 300) as claimed in claim 1 to allow the distribution of the liquid over said gas/liquid contactor (7) and the distribution of the gas.

17. A unit for gas processing or $CO_2$ capture by scrubbing the gas using an absorbent solution, said absorbent solution containing, notably, amines, said unit comprising at least one offshore column (1) as claimed in claim 16, to allow the exchanges between the gas and the absorbent solution.

18. A unit for distillation of a liquid or dehydration of a gas, comprising at least one offshore column (1) as claimed in claim 16, to allow the exchanges between the gas and the liquid.

19. An offshore floating barge, notably for the recovery of hydrocarbons, comprising a gas processing and/or $CO_2$ capture unit as claimed in claim 17.

20. An offshore floating barge, notably for the recovery of hydrocarbons, comprising a distillation and/or dehydration unit as claimed in claim 18.

21. The tray as claimed in claim 13, wherein said orifices located on the tray (100, 200, 300) are distributed regularly in each compartment (103, 203, 303) at a second given pitch.

22. The tray as claimed in claim 21, wherein said second given pitch is a triangular or square pitch.

23. The tray as claimed in claim 1, wherein said perforations are present only between adjacent compartments having means for the passage of liquid through the tray.

* * * * *